United States Patent [19]
Owsley et al.

[11] Patent Number: 5,443,027
[45] Date of Patent: Aug. 22, 1995

[54] LATERAL FORCE DEVICE FOR UNDERWATER TOWED ARRAY

[75] Inventors: Norman L. Owsley, Gales Ferry; John F. Law, Oakdale; Robert D. Vanasse, Columbia, all of Conn.; Stephen P. Ebner, Wheaton; Richard K. Knutson, Germantown, both of Md.; Roger C. Norris, Mystic, Conn.

[73] Assignee: The United States of America as represented by the Secretary of the Navy, Washington, D.C.

[21] Appl. No.: 169,276

[22] Filed: Dec. 20, 1993

[51] Int. Cl.6 .............................................. B63B 21/00
[52] U.S. Cl. ................................... 114/244; 405/158
[58] Field of Search ....................... 405/158, 166, 171; 114/242, 243, 244, 245, 246

[56] References Cited

U.S. PATENT DOCUMENTS

| | | | |
|---|---|---|---|
| 3,375,800 | 4/1968 | Cole et al. | 114/245 |
| 3,931,608 | 1/1976 | Cole | 114/245 X |
| 4,027,616 | 6/1977 | Guenther et al. | 114/244 |
| 4,729,333 | 3/1988 | Kirby et al. | 114/244 |
| 4,798,156 | 1/1989 | Langeland et al. | 405/166 X |

*Primary Examiner*—David H. Corbin
*Attorney, Agent, or Firm*—Michael J. McGowan; Prithvi C. Lall; James M. Kasischke

[57] ABSTRACT

A lateral force device for displacing a towed underwater acoustic cable providing displacement in the horizontal and vertical directions having a spool and a rotationally mounted winged fuselage. The hollow spool is mounted on a cable with cable elements passing therethrough. The winged fuselage is made with the top half relatively positively buoyant and the bottom half relatively negatively buoyant. The winged fuselage is mounted about the hollow spool with clearance to allow rotation of the fuselage. The difference in buoyancy between the upper and lower fuselage maintains the device in the correct operating position. The wings are angled to provide lift in the desired direction as the fuselage is towed through the water.

20 Claims, 3 Drawing Sheets

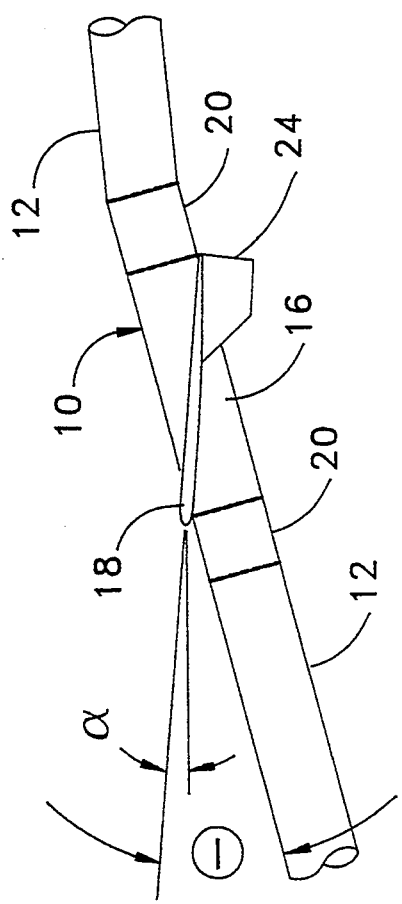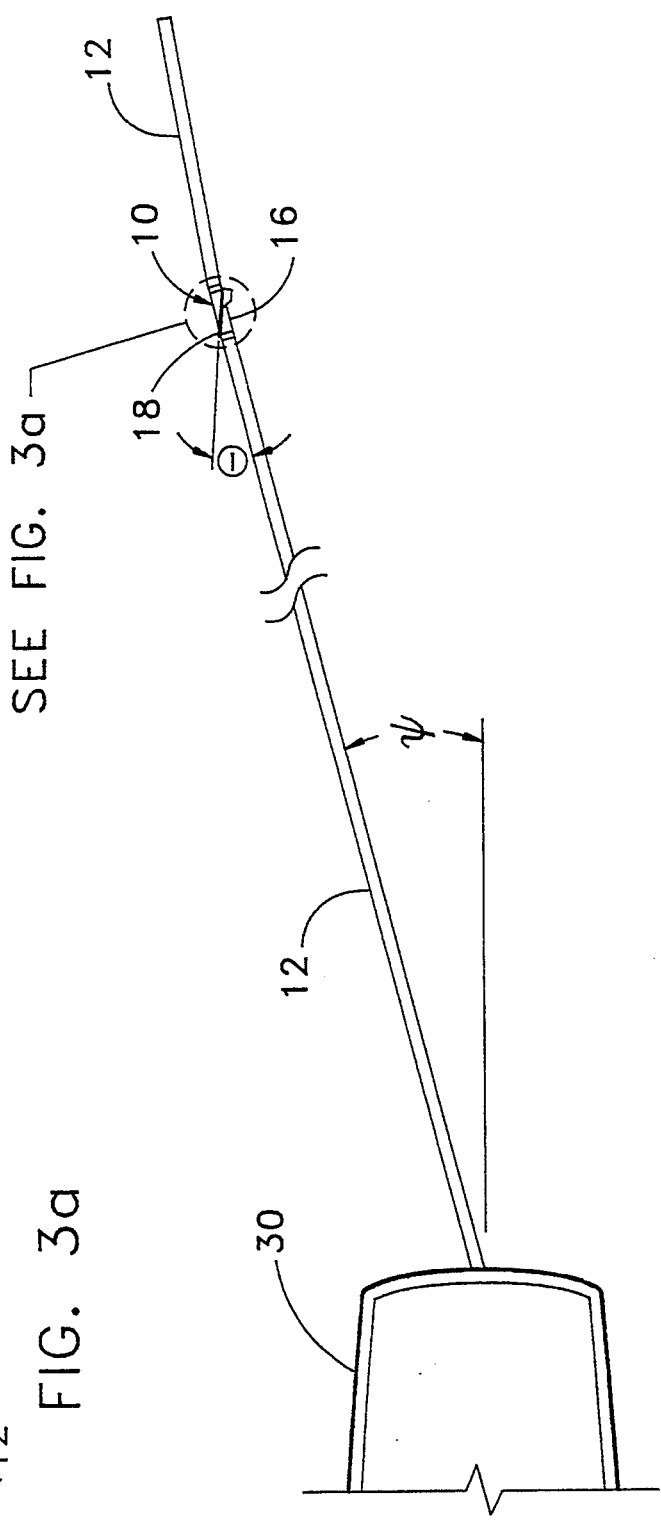
FIG. 3a
FIG. 3

LATERAL FORCE DEVICE FOR UNDERWATER TOWED ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1). Field of the Invention

The present invention relates to a device to provide lateral and vertical displacement of a towed underwater cable and more particularly to a durable lightweight device for displacing an underwater cable which will not create excessive noise as the cable is towed through the water.

(2). Description of the Prior Art

The inventive device has characteristics in common with two other classes of devices, paravanes and depth control systems. Paravanes displace towed cables in a lateral direction away from the path of the towing craft. Depth control systems provide displacement in a vertical direction above or below the towing craft.

It is well known in the art that paravanes are used to provide displacement for towed cables lateral to the motion of the towing craft. Paravanes are towed bodies affixed at the end or along the length of a towed cable to position the cable away from the path of the towing craft. A fin or vane on the paravane causes a lateral displacement of the cable by producing lift in a lateral direction. Prior art paravane systems depend on components other than the vane itself to set and stabilize the direction of the hydrodynamic force. The stabilizing components used in prior art devices include attachment bridles, surface floats on tethers, net floats and trawl chains. These components increase size, weight, drag and noise thereby limiting use of these paravanes to low speeds in sonic operations.

Because many prior art paravanes are large or mechanically complicated devices, they must be removed from the water separately as the tow cable is retracted. Larger paravanes require the use of a hoist to remove them from the water. More complicated paravanes are less sturdy and must be treated with care to avoid damaging their inner workings.

Depth control devices are also well known in the art. Many mechanisms exist for controlling the depth of a towed underwater cable. These methods include diving planes, retractable vanes, air diaphragms, and movable horizontal plates. Adjustable diving planes are often used in the prior art to control the depth of the cable. Vertical displacement is achieved in some prior art devices by changing the buoyancy of the depth control device to maintain the desired depth.

Two prior art patents, Cole U.S. Pat. No. 3,375,800 and Cole U.S. Pat. No. 3,931,608, disclose depth control device that are rotatably mounted on towed acoustic cables. Cole '800 discloses a device mounted around the towed cable that utilizes ballast to maintain the depth control device in its preferred orientation and to prevent spinning. Cole '608 discloses a device mounted to the cable by rotatable brackets in such a way that the device hangs below the cable thus allowing the weight of the device to act as ballast. Both of these devices use pressure sensing means and adjustable diving planes to control depth. Neither of these devices provides for lateral displacement of a towed acoustic cable.

These prior art devices suffer the same durability problems as the more complicated paravanes. Furthermore, none of the known prior art devices are lightweight or simple enough to be wound onto a storage winch or reel with a towed acoustic cable.

SUMMARY OF THE INVENTION

Accordingly, it is a general purpose and object of the present invention to provide an apparatus for controlling the lateral displacement of towed acoustic cables.

It is a further object that such device displace the cable while creating a minimum of turbulence and noise.

Another object is that such device be durable and small enough to be deployed and retrieved with the cable, without requiring attachment or removal during either deployment or retrieval.

These objects are accomplished with the present invention by providing a lateral force device having a spool and a rotationally mounted winged fuselage. The hollow spool is mounted on a cable with cable elements passing therethrough. The winged fuselage is made in two halves with the top half relatively positively buoyant and the bottom half relatively negatively buoyant. The two halves are mounted about the hollow spool with clearance to allow rotation of the winged fuselage. The wings are angled to provide lift as the fuselage is towed through the water. The device can be manufactured with a given buoyancy to allow it to maintain the desired depth. The wings have winglets at their tips. The difference in buoyancy between the upper and lower winged fuselage halves and the winglets maintain the device in the correct operating position.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein:

FIG. 3 shows a vessel towing a cable with a lateral force device disposed thereon;

FIG. 3a shows a detail view of the towed lateral force device of FIG. 3; and

DESCRIPTION OF THE PREFERRED EMBODIMENT

Figure 1:
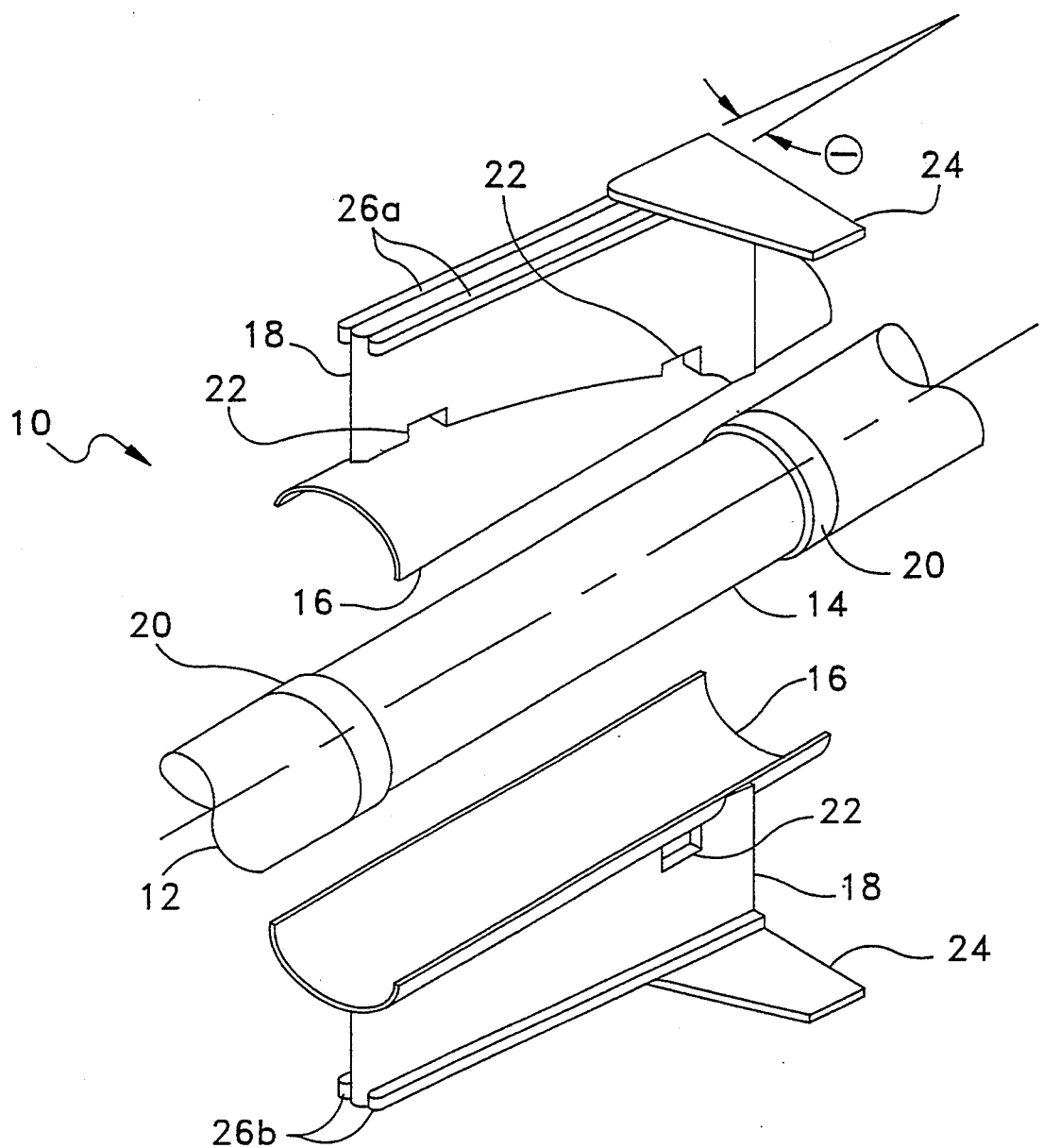
FIG. 1 shows an exploded perspective view of a lateral force device mounted on a towed cable.

In the following text, all references to lateral mean in the direction orthogonal to the direction of tow. Referring now to FIG. 1, there is shown an exploded perspective view of the inventive device. A lateral force device 10 is shown mounted on a towed underwater cable 12. Lateral force device 10 comprises a spool 14, two cylindrical fuselage halves 16, and two wings 18.

Spool 14 is a hollow cylinder with a shoulder portion 20 at each end thereof. Spool 14 is disposed integral with towed underwater cable 12 to allow cable elements and wiring to pass through the hollow in spool 14. Shoulder portions 20 are even with the outer surface of cable 12 to minimize turbulence caused by water flow over a discontinuity between cable 12 and spool 14. Likewise, shoulder portions 20 are the proper depth and spool 14 is the proper length to accommodate mounted cylindrical fuselage halves 16 without having a discontinuity therebetween. Spool 14 can be made from any corrosion resistant material contributing to the desired overall buoyancy of lateral force device 10.

Cylindrical fuselage halves 16 are hollow cylinder halves which may be fastened about spool 14 and retained in a horizontal direction by shoulder portions 20. Cylindrical fuselage halves 16 have an inner diameter when joined which provides a clearance fit between fuselage halves 16 and spool 14. The outer diameter of joined fuselage halves 16 is substantially the same as the diameter of cable 12 and shoulder portions 20 in order to prevent a turbulence causing discontinuity among these parts. Like spool 14, fuselage halves 16 can be made from any corrosion resistant material contributing to the desired overall buoyancy of device 10; however, unlike spool 14, fuselage halves 16 can also be made from two different materials with upper fuselage half 16 made from a relatively buoyant material and lower fuselage half 16 made from a relatively dense material.

One wing 18 is disposed upon each of fuselage halves 16 with the plane of combined wings 18 and the centerline of joined cylindrical fuselage halves 16 forming an angle $\theta$. Angle $\theta$ is chosen for its affect upon the desired towed cable 12 displacement angle. In this embodiment the chosen angle $\theta$ is 12.4°; however, this angle can differ widely with other lateral force device configurations and tow cables. Wings 18 have mounting apertures 22 therein for joining cylindrical fuselage halves 16 together. Mounting apertures 22 extend through each wing 18 along the portion of wing 18 joined to each cylindrical fuselage half 16.

Disposed upon the extremity of each wing 18, away from fuselage halves 16 are a winglet 24 and ballast strips 26a and 26b. Winglet 24 extends horizontally away from the vertical plane of wings 18 toward the high pressure side of wing 18. Ballast strips 26a and 26b extend for a slight distance perpendicular to wing 18 thereby channeling fluid flow over the wing surface to increase the effective aspect ratio of wings 18 and prevent vortex shedding off of wings 18. In addition to channeling fluid flow, winglets 24 provide a dihedral force to prevent sagging of cable 12 and control the attitude of device 10. Like fuselage halves 16, wings 18 and winglets 24 can be made from the same corrosion resistant material or two or more corrosion resistant materials with different buoyancies.

In one embodiment, ballast strips 26a and 26b are disposed at the extremity of wings 18 to provide a buoyant force differential to maintain the orientation of lateral force device 10. Ballast strips 26a are mounted on upper wing 18 and have a positive buoyancy in water. Ballast strips 26b are mounted on lower wing 18 and have a negative buoyancy. Thus the differential in buoyancy between upper ballast strips 26a and lower ballast strips 26b provides a righting moment to maintain lateral force device 10 in the vertical position and prevent joined fuselage halves 16 and wings 18 from spinning on spool 14. As an alternative, lateral force device 10 can be manufactured with imbalanced buoyant forces causing wings 18 to be angled with respect to the vertical in the normal operating position and resulting in displacement of towed acoustic cable 12 in both the lateral and vertical directions.

Figure 2:
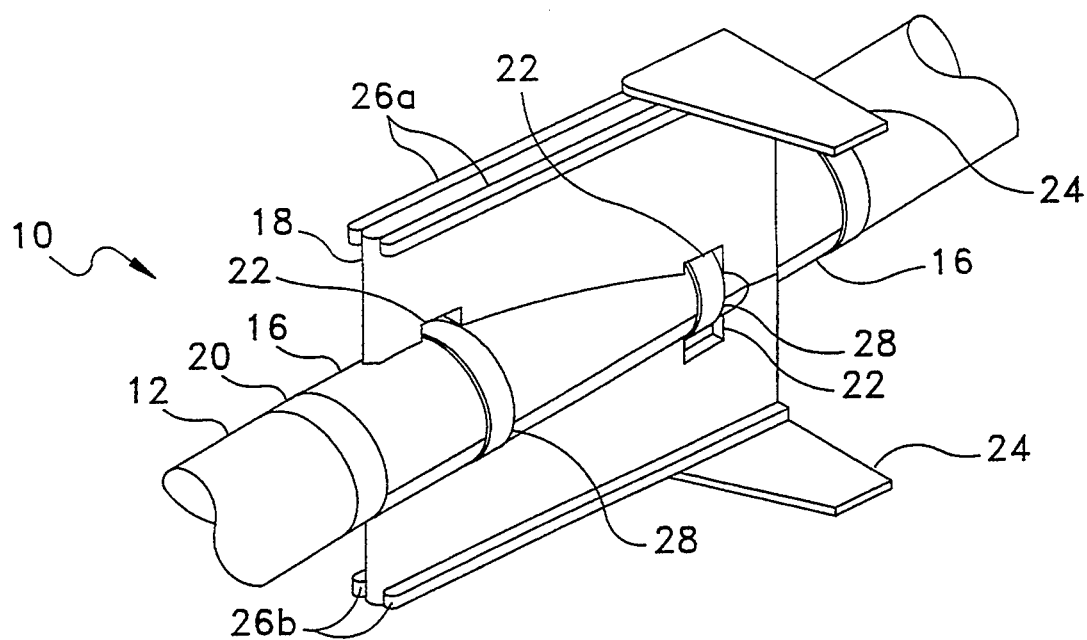
FIG. 2 shows a perspective view of a lateral force device as assembled on a towed cable.

Referring now to FIG. 2, there is shown a perspective view of the inventive device as assembled on cable 12. Cylindrical fuselage halves 16 are assembled to form a hollow cylinder about spool 14. Mounting bands 28 are inserted through corresponding mounting apertures 22 on upper and lower fuselage halves 16 and fastened thereabout to hold upper fuselage half 16 against lower fuselage half 16. Mounting bands 28 can be tie wraps or other strap type fasteners. A clearance fit exists between spool 14 and fuselage halves 16. Fuselage halves 16 are prevented from sliding in a horizontal direction by shoulder portions 20. Combined fuselage halves 16 are thus free to rotate about spool 14.

In operation, cable 12 is towed from a vessel causing water to flow by device 10. The hydrodynamic flow over angled wings 18 creates a pressure differential between one side of wings 18 and the other side resulting in a force being exerted on cable 12 in a direction away from its centerline, toward the low pressure side of wings 18. Winglets 24 provide a dihedral force to keep lateral force device 10 aligned with cable 12. The orientation of device 10 is maintained by the difference in buoyancy between upper ballast strip 26a and lower ballast strip 26b, upper and lower fuselage halves 16, upper and lower winglets 24, and also by the dihedral force generated by winglets 24.

Referring now to FIG. 3 and FIG. 3a, there is shown a lateral force device 10 towed on a cable 12 behind a vessel 30. When vessel 30 tows lateral force device 10 through the water, device 10 produces hydrodynamic lift port or starboard of the towing vessel depending on device 10 angle. Under steady tow, device 10 operates at an angle of attack, $\alpha$, which is somewhat less than the angle $\theta$ between wing 18 and fuselage 16. The tow cable angle $\psi$ depends primarily on the tension in tow cable 12 and the lateral force generated by device 10. Tow cable angle $\psi$ is always less than wing to fuselage angle $\theta$. Multiple lateral force devices 10 can be used on the same cable. For a given device 10 and cable 12, a spacing of devices 10 can be determined to horizontally displace a cable in a substantially straight line at an angle $\psi$.

Figure 4:
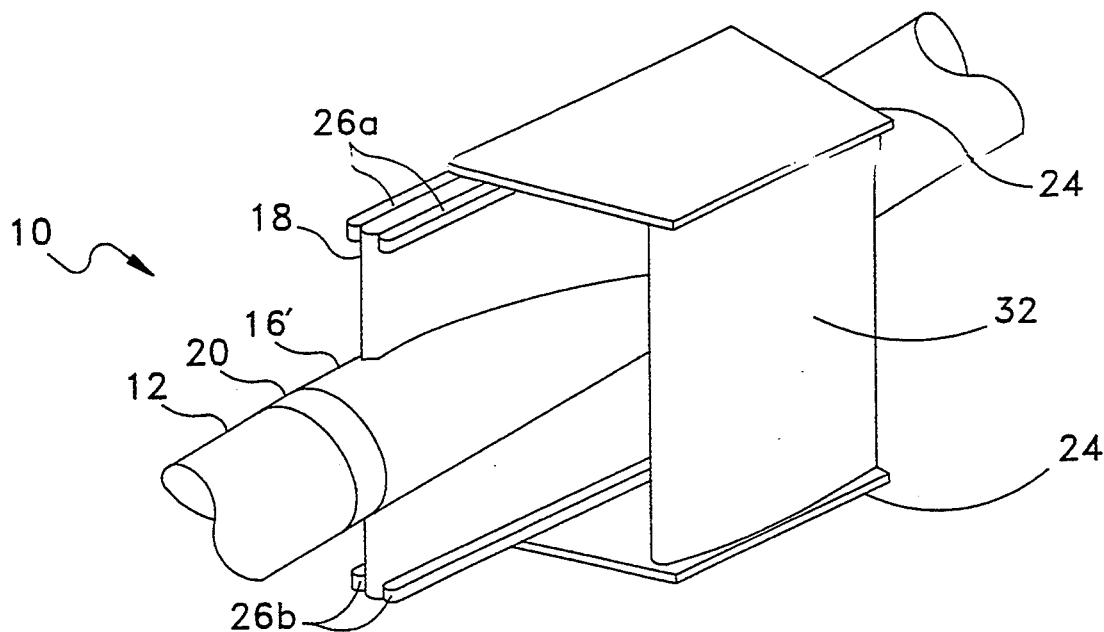
FIG. 4 shows an alternate embodiment of the inventive device having a bi-wing configuration.

FIG. 4 displays an alternate embodiment of lateral force device 10 having a bi-wing configuration. As in the first embodiment, the alternate embodiment is configured on a cable 12 about a spool 20. Device 10 comprises a fuselage 16', shown here manufactured in one piece, with a wing 18 disposed thereon at an angle to the centerline of fuselage 16'. Positively bouyant ballast strips 26a are disposed upon the upper distal edge of wing 18, and negatively bouyant ballast strips 26b are disposed on the lower distal edge of wing 18. Disposed upon the extremities of wing 18, away from fuselage 16' are two dihedral winglets 24 and ballast strips 26a and 26b. Winglet 24 extends horizontally away from the vertical plane of wings 18 toward the high pressure side of wing 18. A bi-wing 32 is disposed at the between the distal ends of winglets 24. Bi-wing 32 increases the lift delivered by lateral force device 10 and prevents entanglement when cable 12 and device 10 is retracted.

The advantages of the present invention over the prior art are that the present invention provides a mechanically simple, durable, small, lightweight device to horizontally displace a cable. This device can be coiled upon a reel with the towed array and stored without precautions to avoid damaging the device or harming its functionality. If any damage to the device occurs, the device can be removed from the towed array and replaced by removing the bands and separating the fuselage halves.

What has thus been described is a simple, low cost lateral displacement device that is mounted on a towed array cable to displace the cable in a desired direction when the cable is towed through the water. The device can be manufactured with greater or lesser buoyancy to maintain the towed cable at a preset depth. The buoyancy of the device can be off center to hold the device at an angle to the vertical thus causing displacement in both the lateral and vertical directions. The device displaces the cable by the action of the force generated when water passes over the wing of the device while creating a minimum of noise.

Obviously many modifications and variations of the present invention will become apparent in light of the above teachings. For example: the winglets can be eliminated or moved; the wing portions, bi-wing and winglets can have airfoil-shaped cross sections; the wing portions can be made with camber; the wings can have a dihedral angle between them; the leading and trailing edges of the wings can be swept to provide better flow characteristics; the fuselage can be made in one piece about the spool; the bearing surfaces between the spool and fuselage can incorporate low friction bushings or dynamic bearings; and the ballast can be located within the winglets, wings or spool engagement portion of the fuselage.

In light of the above, it is therefore understood that within the scope of the appended claims, the invention can be practiced otherwise than as specifically described.

What is claimed is:

1. A lateral force device for controlling lateral displacement of an underwater towed cable comprising:
   a hollow spool having forward and rear annular shoulders and a cylindrical body disposed along said towed cable with said towed cable extending through the hollow portion thereof;
   a fuselage having a cylindrical inner surface disposed rotatably about said cylindrical body of said spool and retained horizontally on said spool by said forward and rear annular shoulders of said spool;
   a wing fixed to said fuselage, said wing being oriented substantially vertically and angled with respect to the centerline of said fuselage and said spool;
   a positively buoyant member disposed on the upper half of said wing/fuselage combination of said lateral force device; and
   a negatively buoyant member disposed on the lower half of said wing/fuselage combination of said lateral force device for producing a righting moment in combination with said positively buoyant member when said fuselage rotates from the preselected position.

2. The device of claim 1 wherein said positively buoyant member comprises at least one buoyant ballast strip disposed on the upper half of said wing/fuselage combination of said lateral force device at the extremity of said wing portion to provide positive buoyancy to said upper half of said wing/fuselage combination.

3. The device of claim 2 wherein said negatively buoyant member comprises at least one dense ballast strip disposed on the lower half of said wing/fuselage combination of said lateral force device at the extremity of said wing portion to provide negative buoyancy to said lower half of said wing/fuselage combination.

4. The device of claim 3 further comprising:
   an upper winglet disposed on the upper half of said wing/fuselage combination of said lateral force device at the extremity of said wing portion, said upper winglet being oriented to maintain said device coaxially with said cable; and
   a lower winglet disposed on the lower half of said wing/fuselage combination of said lateral force device at the extremity of said wing portion, said lower winglet being oriented to maintain said device coaxially with said cable and to balance undesired forces acting on said upper winglet.

5. The device of claim 4 wherein said positively buoyant member and said negatively buoyant member are disposed on said lateral force device offset from the vertical centerline of said lateral force device to provide a nonvertical orientation of said lateral force device.

6. The device of claim 5 further comprising bearings disposed on said shoulders of said spool for allowing said wing/fuselage combination to rotate more freely about said spool.

7. The device of claim 5 further comprising bearings disposed at the ends of said fuselage for allowing said wing/fuselage combination to rotate more freely about said spool.

8. The device of claim 4 further comprising a bi-wing disposed at the extremity of said upper winglet and the extremity of said lower winglet away from said wing, said bi-wing being oriented substantially parallel to said wing.

9. The device of claim 3 further comprising:
   a first winglet disposed on one side of said fuselage of said lateral force device, said first winglet being oriented to maintain said device in the correct operating position; and
   a second winglet disposed on the other side of said fuselage of said lateral force device, said second winglet being oriented to maintain said device in the correct operating position.

10. The device of claim 9 wherein said positively buoyant member and said negatively buoyant member are disposed on said lateral force device offset from the vertical centerline of said lateral force device to provide a nonvertical orientation of said lateral force device.

11. The device of claim 10 further comprising bearings disposed on said shoulders of said spool for allowing said wing/fuselage combination to rotate more freely about said spool.

12. The device of claim 10 further comprising bearings disposed at the ends of said fuselage for allowing said wing/fuselage combination to rotate more freely about said spool.

13. A lateral force device for controlling lateral displacement of an underwater towed cable comprising:
   a hollow spool having forward and rear annular shoulders and a cylindrical body disposed along said towed cable with said towed cable extending through the hollow portion thereof;
   an upper fuselage half having an upper hollow half cylindrical portion and a transverse wing portion disposed on said cylindrical portion, said wing portion being angled from the centerline of said cylindrical portion;
   a lower fuselage half having a lower hollow half cylindrical portion and a transverse wing portion disposed on said cylindrical portion, said wing portion being angled from the centerline of said cylindrical portion;

a joining means for attaching said upper and lower fuselage halves about said spool with said cylindrical body of said spool disposed between said cylindrical portions of said upper and lower fuselage halves;

a positively buoyant member disposed on said upper fuselage half of said lateral force device; and a negatively buoyant member disposed on said lower fuselage half of said lateral force device for producing a righting moment in combination with said positively buoyant member when said combined fuselage halves rotate from the preselected position.

14. The device of claim 13 further comprising:

an upper winglet disposed on said upper fuselage half at the extremity of said wing portion, said upper winglet being oriented to maintain said device coaxially with said cable; and a lower winglet disposed on said lower fuselage half at the extremity of said wing portion, said lower winglet being oriented to maintain said device coaxially with said cable and to balance undesired forces acting on said upper winglet.

15. The device of claim 14 wherein said positively buoyant member comprises at least one buoyant ballast strip disposed on the extremity of said wing on said upper fuselage half to provide positive buoyancy to said upper fuselage half.

16. The device of claim 15 wherein said negatively buoyant member comprises at least one dense ballast strip disposed on the extremity of said wing on said lower fuselage half to provide negative buoyancy to said lower fuselage half.

17. The device of claim 16 wherein said positively buoyant member and said negatively buoyant member are disposed on said lateral force device offset from the vertical centerline of said lateral force device to provide a nonvertical orientation of said lateral force device.

18. The device of claim 17 further comprising bearings disposed on said shoulders of said spool for allowing said combined fuselage halves to rotate more freely about said spool.

19. The device of claim 17 further comprising bearings disposed at the ends of said fuselage for allowing said combined fuselage halves to rotate more freely about said spool.

20. The device of claim 14 further comprising a bi-wing disposed at the extremity of said upper winglet and the extremity of said lower winglet away from said wing, said bi-wing being oriented substantially parallel to said combined wing portions.

* * * * *